(12) United States Patent
Bedert et al.

(10) Patent No.: US 11,173,882 B2
(45) Date of Patent: Nov. 16, 2021

(54) HYDRODYNAMIC RETARDER SYSTEM

(71) Applicant: DANA BELGIUM N.V., Bruges (BE)

(72) Inventors: Jan A. Bedert, Oostuduinkerke (BE); Hein Nevejant, Houghulst (BE); Joachim Van Dingenen, Ghent (BE)

(73) Assignee: DANA BELGIUM N.V., Bruges (BE)

( * ) Notice: Subject to any disclaimer, the term of this patent is extended or adjusted under 35 U.S.C. 154(b) by 87 days.

(21) Appl. No.: 16/604,671

(22) PCT Filed: Apr. 10, 2018

(86) PCT No.: PCT/EP2018/059203
§ 371 (c)(1),
(2) Date: Oct. 11, 2019

(87) PCT Pub. No.: WO2018/189203
PCT Pub. Date: Oct. 18, 2018

(65) Prior Publication Data
US 2020/0070786 A1     Mar. 5, 2020

Related U.S. Application Data

(60) Provisional application No. 62/484,100, filed on Apr. 11, 2017.

(51) Int. Cl.
*B60T 1/087*     (2006.01)
*B60T 10/02*     (2006.01)
*F16D 57/04*     (2006.01)

(52) U.S. Cl.
CPC .............. *B60T 1/087* (2013.01); *B60T 10/02* (2013.01); *F16D 57/04* (2013.01)

(58) Field of Classification Search
CPC .......... B60T 1/087; B60T 10/02; F16D 57/04; F16D 57/06
(Continued)

(56) References Cited

U.S. PATENT DOCUMENTS 3,180,692 A * 4/1965 Muller .................... F16H 41/30
303/5
3,297,114 A    1/1967 Erdman
(Continued)

FOREIGN PATENT DOCUMENTS

DE     3511795     9/1986
DE     3713580     11/1988
(Continued)

OTHER PUBLICATIONS

Allison Transmission, Service Manual 5900/6000 Series Off-Highway Transmissions, 2007, United States of America. 6 pages.
(Continued)

*Primary Examiner* — Thomas J Williams
(74) *Attorney, Agent, or Firm* — McCoy Russell LLP

(57) ABSTRACT

A hydrodynamic retarder system for a vehicle is provided. In a first operational state with the vehicle powered on and a retarder deactivated, a pump directs fluid flow from a fluid sump to a retarder inlet valve in the closed position and directs fluid flow to a second sump. In a second operational state with the vehicle on and the retarder activated, the retarder inlet valve moves to the open position directing fluid flow into a retarder chamber and flowing out of the retarder chamber after filling a second volume and discharging to the second sump.

19 Claims, 3 Drawing Sheets

VEHICLE ENGINE ON-RT OFF

(58) Field of Classification Search
USPC .................................. 188/290, 293, 294, 296
See application file for complete search history.

(56) References Cited

U.S. PATENT DOCUMENTS

| | | | |
|---|---|---|---|
| 3,863,739 A | | 2/1975 | Schaefer |
| 3,958,671 A | | 5/1976 | Muller |
| 4,343,383 A | * | 8/1982 | Brosius .................... F16D 57/04 188/296 |
| 4,432,442 A | * | 2/1984 | Vogelsang ............... F16D 57/04 188/290 |
| 4,836,341 A | | 6/1989 | Hall, III |
| 4,881,625 A | | 11/1989 | Redelman |
| 5,771,997 A | * | 6/1998 | Friedrich ................. B60T 1/087 188/296 |
| 5,937,817 A | | 8/1999 | Schanz |
| 6,817,455 B1 | * | 11/2004 | Gazyakan ............... B60T 1/087 188/290 |
| 7,017,546 B1 | | 3/2006 | Patel |
| 7,036,464 B2 | | 5/2006 | Luther |
| 8,230,835 B2 | | 7/2012 | Gibson |
| 9,377,066 B2 | | 6/2016 | Guillotte |
| 2004/0238301 A1 | | 12/2004 | Kamossa |
| 2013/0074798 A1 | | 3/2013 | Shaffer |
| 2014/0131153 A1 | | 5/2014 | Dieter |

FOREIGN PATENT DOCUMENTS

| | | | | |
|---|---|---|---|---|
| DE | 4442219 | | 6/1995 | |
| DE | 19732278 A1 | * | 1/1999 | ................ B60T 8/00 |
| DE | 19934621 | | 1/2001 | |
| DE | 102006030792 | | 1/2008 | |
| DE | 102012004332 | | 9/2013 | |
| DE | 102015201910 | | 8/2016 | |
| EP | 1308359 | | 5/2003 | |
| EP | 2035268 | | 3/2009 | |
| GB | 2052658 | | 1/1981 | |
| WO | WO-2008000604 A1 | * | 1/2008 | ............. B60T 10/02 |
| WO | 2016209149 | | 12/2016 | |
| WO | 2017050674 | | 3/2017 | |

OTHER PUBLICATIONS

TEREX, TA30 (Tier 3) Articulated Dumptruck Maintenance Manual Cover Page, Table of Contents pp. 1-2, General Information pp. 1-3, Transmission and Mounting pp. 1-32. Jan. 21, 2020, http://constructionsupport.terex.com/_library/technical_assistance/Terex_Equipme nt_Ltd/maintenance_guides/TA/TA30_T3_SP2_902.pdf.

Voith, Voith Retader 115 CN, Jan. 21, 2020, http://www.voith.com/ca-en/products-services/power-transmission/retarders-bus/vo ith-retarder-115-cn-10932.html, 2 pages.

ZF Intarder Trucks and Buses, Technical Manual for Installation and Initial and Start-up, Edition Jun. 2006, ZF Friedrichshafen AG, Germany. 1 page.

ZF Motion and Mo, Ergopower LII, Jan. 21, 2020, https://www.zf.com/products/media/en/industrial/construction/downloads_1/DS_Ergo power_LII_en_NEU.pdf, 2 pages.

ZF Products for Trucks, Good Braking Better Driving Intarder, Jan. 21, 2020. https://www.zf.com/products/en/trucks/intarder/intarder. html, 8 pages.

ZF Products for Trucks, Intarder for Truck Transmissions, Jan. 21, 2020, https://www.zf.com/products/en/trucks/products_29258.html, 4 pages.

* cited by examiner

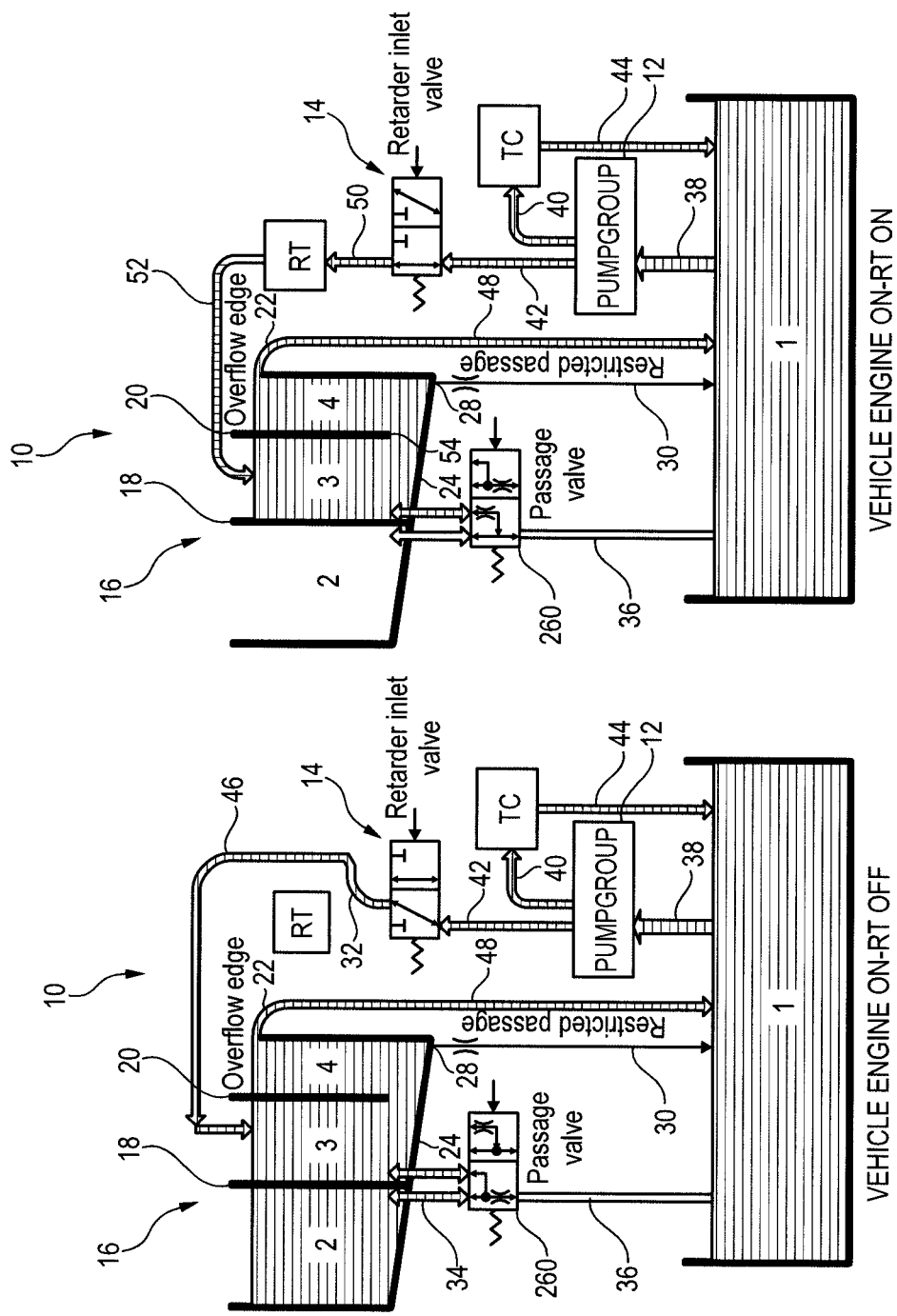

HYDRODYNAMIC RETARDER SYSTEM

BACKGROUND

The present disclosure is related to vehicle brake assist methods and systems for vehicles. In particular, the methods and systems relate to hydraulic or hydrodynamic retarders e.g. for vehicle transmissions. More specifically, the methods and systems are directed to integrated transmission and hydrodynamic retarders for road and off-road vehicles such as trucks, buses, wheel loaders, dump trucks, having a fluid handling, distribution and level that can be controlled for proper or optimized performance of the system. The disclosure also relates to a transmission with a hydrodynamic retarder having sump level optimization and control.

In hydrodynamic transmissions, a retarder can be connected to the transmission system, typically directly or indirectly to the transmission drive shaft to assist braking by slowing the rotation of the drive shaft. The retarder uses the viscous drag forces on movable vanes connected to a rotor or drive shaft housed or passing through a fluid-fillable chamber of the retarder. The viscous drag or friction by the fluid acting against the vanes of the rotor or drive shaft of the transmission slow their rotation and assist vehicle braking. This slowing of the drive shaft is especially helpful when the brakes are under heavy use on declined surfaces. The chamber can also include stationary vanes attached to the interior housing or stator. Both movable and static vanes can be configured to increase the viscous or frictional drag of the fluid. The movable vanes can be attached to the transmission drive shaft or a separate rotor that is connected to the drive shaft directly or through a gear or gear box to slow the driveshaft further and assist the braking of the vehicle. Retarder systems can use standard transmission fluid (gear oil), engine oil, or a separate fluid, fluid mixtures, or oil.

When vehicle braking assistance or retardation is needed, fluid, typically transmission fluid or oil is pumped into the retarder chamber, and the viscous drag against the vanes or fins on a rotor connected to or part of the drive shaft will slow the vehicle. The friction or viscous drag can heat the fluid. Overheated fluid has reduced viscosity and performance. To prevent overheating, the fluid can be circulated through a cooling system such as the vehicles existing engine cooling system or a separate cooling system specific to the transmission and retarder system and then returned to the oil or fluid sump. The degree of retardation can be varied by adjusting the fill level of the retarder chamber and pressure in the chamber.

Besides heating of the oil, the churning of the fluid in the retarder chamber and even flow through the transmission can aerate or introduce air bubbles into the fluid. Pumps in the fluid circuit can also introduce air. When the fluid becomes increasingly aerated, it can become less viscous and result in reduced retardation. In addition, when a shared fluid circuit is used for the retarder system and transmission system, the aerated fluid can also impact the transmission function. Separate fluid circuits can be used for the transmission and retarder system but this requires additional space, components and costs.

When integrating a hydrodynamic retarder on a transmission whether or not a separate or shared fluid circuit e.g. transmission and retarder fluid circuit is used several competing issues become apparent. One issue identified above, is aeration of the fluid. The longer aerated fluid is left to sit in the fluid sump, the greater the likelihood the air will dissipate or de-aerate over time. Accordingly, the fluid sump volume or size can be maximized such that there is always an amount of fluid de-aerating in the fluid sump while other fluid is flowing through the system. This typically means a relatively large reservoir sump is needed to allow filling of the entire circuit which can include the retarder, flow lines, transmission circuit, and cooling system if any, while also reserving a large enough volume of fluid in the sump before any part of the fluid flowing through the circuit returns to the sump for reuse. In other words, a larger sump to contain a larger volume of fluid can improve de-aeration.

A large overall volume of fluid can also address the issue of having a sufficient fluid volume in the fluid sump to accommodate varying operating conditions such as when there is a long term need for retardation. Preferably, classic hydraulic open circuit system, sump fluid volume should be optimized to have a good fluid de-aeration. In addition, having sufficient sump volume to permit significant retarder operation over various operation conditions before any aeration or over heating of oil occurs.

In addition, the sump should be shaped or configured and have a fluid level that the changing vehicle terrain such as steep inclines or declines does not result in oil shifting in the oil sump and causing the pump to draw air instead of oil into the retarder and or transmission system. In other words, a vehicle may encounter unusual vehicle orientation such as an unusually steep or varied terrain which can result in dead air or voids in the fluid sump. Dead air and voids should be avoided otherwise the pump may draw air in the system.

Besides the typical constraint of limited installation space in the vehicle, which limits sump volume than may otherwise be desired, i.e. a large volume sump there is also issue of keeping the level of fluid in the sump. In systems which integrate fluid sump with the transmission, the level of fluid should preferably be low enough to avoid contact with the moving gears of the transmission taking into account various vehicle orientations to avoid energy losses and churning of the fluid by the rotating transmission gears or parts operating just above the sump. In other words, the oil level should not contact the gears in the transmission case especially for extended periods of time. Accordingly, in practice this means little variation to sump volume and level is available.

Some known transmission and retarder systems include:

U.S. Pat. No. 3,863,739 which is incorporated in its entirety herein by reference discloses valves guiding oil from the transmission into the retarder when retarder is activated. The retarder is by-passed when it is shut off. No special means are claimed for devices or systems to deliver the fluid volume needed to fill the retarder.

U.S. Pat. No. 5,771,997 which is incorporated in its entirety herein by reference discloses a standalone retarder hydraulic circuit with its own sump. Air pump delivers air pressure to the fluid surface of the RT oil sump. Consequently, oil is forced to fill the retarder. The disadvantage of this system is the need for a pneumatic system on the vehicle. Also, the RT is a completely independent system from the rest of the driveline.

A publically accessible technical disclosure from ZF Friedrichshafen AG "ZF-Intarder—Technical manual 6085 765 104d", p 17-1 & 17-2 on the use of an accumulator in a retarder system is shown in FIG. 1 and is available at http://truck-expert.net/ZF-Transmission-Service-Literature_1707.html sourced from which is incorporated in its entirety herein by reference. In the embodiment shown in FIG. 1 the retarder hydraulic circuit is a standalone system with its own sump, also using a pneumatic system. The air pressure not set directly to the fluid surface, but on an accumulator which on its turn forces oil in the system. Together with valves at retarder inlet and outlet and an ECU (electronic control unit), retarder fill is managed. The disadvantages are the need for special devices (mainly accumulator and accumulator charge valve) and an additional pressure source to apply to the accumulator.

SUMMARY

The invention is defined by the appended claims. Embodiments or examples not covered by the claims are provided for better understanding the invention.

In one embodiment, a hydrodynamic retarder system for a vehicle is provided. The hydrodynamic retarder system comprises: a fluid sump for housing a fluid and having a first fluid volume; a pump for pumping a fluid from the fluid sump; a retarder having a fluid chamber for housing a second volume of the fluid; a second sump for housing at least a third volume of the fluid and fluidly connected to the fluid sump; the third volume being substantially the same volume as the second volume; and a retarder inlet valve fluidly connected to the fluid sump via the pump and movable between a closed position for directing fluid flow to the second sump and an open position for directing fluid flow to the retarder, the valve movable from the closed position to the open position when the retarder is activated.

In a first operational state with the vehicle powered on and the retarder deactivated, the pump directs fluid flow from fluid sump to the retarder inlet valve being in the closed position and directing fluid flow to second sump.

Furthermore, in a second operational state with the vehicle on and retarder activated, the retarder inlet valve moves to the open position directing fluid flow into the retarder chamber and flowing out of the retarder chamber after filling the second volume and discharging to the second sump.

In one implementation, the system may be configured such that in the second operational state the fluid flow from the second sump to the fluid sump has a flow rate that matches a flow rate of the fluid flow flowing from the fluid sump into the retarder.

In its closed position, the retarder inlet valve typically bypasses the retarder by directing the fluid coming from the fluid sump directly into the second sump. In the open position, the retarder inlet valve directs fluid flow from the fluid sump through the retarder and to the second sump.

In a further implementation, the second sump may be fluidly connected to the fluid sump at least at an overflow opening positioned to allow the second sump to contain up to the third volume of the fluid. For instance, the overflow opening may be positioned at a predetermined height of the second sump to maintain fluid at the third volume by allowing fluid flowing into the second sump to exit to the fluid sump. The overflow opening can be e.g. an overflow edge. The overflow opening typically restricts the amount of fluid contained in the second sump to a predetermined volume.

Optionally, the hydrodynamic retarder system comprises a passage valve actuatable between at least a first position allowing fluid flow from the second sump to the fluid sump and a second position preventing or restricting fluid flow from secondary sump to the fluid sump, wherein the restricted fluid flow from the second sump to the fluid sump in the second position of the valve is smaller than the fluid flow from the second sump to the fluid sump in the first position of the valve.

In one configuration, the restricted fluid flow is small enough to allow the second sump to get entirely filled in the first operational state and/or the second operational state.

Optionally, in the second operational state the passage valve is in the first position to allow fluid flow from the second sump to the fluid sump. The passage valve may be fluidly connected to the fluid sump via a ninth fluid line allowing fluid flow from the second sump to the fluid sump.

Optionally, in the first operational state the passage valve is in the second position allowing the second sump to fill until fluid discharges from the overflow opening, the vehicle is powered off or the retarder is activated.

The hydrodynamic retarder system can further comprise a device that is in fluid communication with the fluid sump. The device can be any device in the vehicle that may occasionally, periodically or permanently require fluid from the fluid sump. The pump may be additionally configured to pump fluid from the fluid sump through the device and back to the fluid sump. The pump may be in fluid connection with the device via a seventh fluid line. Further, the device may be fluidly connected to the fluid sump via an eighth fluid line.

According to one embodiment, the hydrodynamic retarder system is a hydrodynamic transmission and retarder system. For example, the aforementioned device may be a transmission. The transmission may be in fluid communication with the fluid sump, wherein the pump is additionally configured to pump fluid from the fluid sump through the transmission and back to the fluid sump.

According to one embodiment, the second sump includes a full partition wall separating the second sump into two fluid compartments. One of the two compartments or at least one of the two compartments or both compartments may have a volume about equal to the third volume.

When the passage valve is in the first position, the passage valve may allow fluid flow from one of the compartments having the third volume to the fluid sump and may prevent or restrict fluid flow between the two compartments. When the passage valve is in the second position, the passage valve may prevent or restrict fluid flow from the second sump to the fluid sump and may allow fluid flow between the two compartments.

In one embodiment, the second sump includes a partial wall for separating an upper portion of the fluid contained in a first partition space from a second partition space and allowing fluid communication at a lower portion of the fluid contained in the second sump. Fluid flow from the retarder inlet valve in the closed position or from retarder chamber may flow to the first partition space. The second partition space may include the connection to the fluid sump. For instance, the second partition space may include the overflow opening or an overflow wall. Optionally, the partial wall can extend upwards to a level above the overflow wall or the overflow opening. Furthermore, the partial wall can extend downwards short of contact with a bottom of the second sump to form a flow passage at a bottom of the second sump. The flow passage formed by the partition wall of the second sump may allow fluid flow and fluid communication in the first and second partition spaces.

In a further example, the other one of the two compartments includes a partial wall for separating an upper portion of the fluid contained in a first partition space from a second partition space of the other one the compartments and allowing fluid communication at a lower portion of the fluid contained in the other one of the compartments and wherein fluid flow from the retarder inlet valve in the closed position or from retarder chamber flows to the first partition space and second partition includes the overflow opening.

A drain opening may be provided in a floor of the second sump. Furthermore, a further drain opening may be provided in a floor of the fluid sump. Preferably, the second sump floor is sloped downwards. Furthermore, a fluid sump floor may be sloped downwards. The drain opening may be provided at the lowest point of the fluid sump floor and/or the second sump floor. At least one drain valve may be provided for opening and closing the drain opening of the fluid sump floor and/or the drain opening of the second sump floor. The system may further include a sixth fluid line connecting the drain opening of the second sump with the fluid sump, the drain opening allowing fluid in the second sump to drain or empty into the fluid sump via the sixth fluid line. By using the drain opening in the fluid sump floor and/or the drain opening in the second sump floor the fluid in the fluid sump and/or the second sump may be drained or emptied e.g. for maintenance purposes. The fluid flow through the drain opening to the fluid sump may be smaller than the fluid flow from the retarder inlet valve and/or the retarder to the second sump allowing the second sump to be filled e.g. up to the overflow opening or overflow edge. The drain opening may be provided in the second partition space.

In one embodiment, the second sump is positioned at a height or level above the fluid sump and/or the pump. In this way, gravity may assist in fluid flow towards the fluid sump at least when the pump is not operating. When the vehicle is switched off, the fluid flow from the second sump to the fluid sump may cause the second sump to be fully or at least substantially emptied. Thus, in a third operational state with the vehicle powered off, after flowing into the fluid sump all the fluid or substantially all the fluid of the system may reside in the fluid sump.

In one embodiment, the flow out of the second sump can occur concurrently and at approximately the same rate or about the same rate with filling the retarder. In another embodiment, the flow out of the second sump can occur after a predetermined time and slightly slower than the filling rate of the retarder. In one embodiment, a separate pump can connect the second sump to the fluid sump. The separate pump is configured to provide a fluid flow from the second sump to the fluid sump having a flow rate that matches the flow rate of the pump to the retarder.

The drain opening of the second sump may be formed such that the fluid flow from the retarder and/or the retarder inlet valve into the second sump is larger than the fluid flow from the drain opening to the fluid sump. In other words, the flow-in of the fluid supplied to the second sump may exceed the flow-out of the restriction passage.

In one embodiment, the fluid sump is fluidly connected to the pump via a first fluid line.

In one embodiment, the pump is fluidly connected to the retarder inlet valve via a second fluid line.

In one embodiment, the retarder inlet valve is fluidly connected to the retarder via a third fluid line, for example in the open position of the retarder inlet valve.

In one embodiment, the retarder inlet valve is fluidly connected to the second sump via a fourth fluid line, for example in the closed position of the retarder inlet valve.

In one embodiment, the retarder is fluidly connected to the second sump via a fifth fluid line.

The fifth fluid line connecting the retarder with the second sump and the fourth fluid line connecting the retarder inlet valve with the second sump can combine at a joint to provide a single flow line discharging into the second sump.

The fourth fluid line, the fifth fluid line and/or the single flow line can extend into the second sump to prevent bubble or air formation in the fluid.

In one embodiment, the second sump is fluidly connected to the fluid sump at least via a sixth fluid line. The sixth fluid line may fluidly connect the drain opening in the second sump to the fluid sump.

In one embodiment, the pump is fluidly connected to the transmission via a seventh fluid line.

In one embodiment, the transmission is fluidly connected to the fluid sump via an eighth fluid line.

In one embodiment, the passage valve is fluidly connected to the fluid sump via a ninth fluid line.

In one embodiment, the overflow opening may be fluidly connected to the fluid sump via a tenth fluid line. In one embodiment, the tenth fluid line connecting the second sump and the fluid sump is positioned such to maintain a volume of fluid in the second sump which is at least approximately the second volume needed to fill the retarder.

Thus, the fluid connection between the second sump and the fluid sump allowing fluid flow from the second sump to the fluid sump may comprise the sixth fluid line, the ninth fluid line and/or the tenth fluid line. The system may be configured such that in the second operational state a fluid flow from the second sump to the fluid sump through the sixth fluid line, the ninth fluid line and the tenth fluid line has a flow rate that matches a fluid rate of the fluid flow flowing into the second sump.

The hydraulic system described in this disclosure can be operated manually e.g. by an operator or automatically by using automated systems, e.g. by a controller. For this purpose, the controller may be operatively connected to the pump, the retarder inlet valve, the retarder, the transmission, the passage valve and/or the drain valve mentioned above. Further, one or more sensors may be connected to the controller. The one or more sensors may be arranged in one of the aforementioned fluid lines, in the second sump, the fluid sump, the pump, the retarder inlet valve and/or the passage valve. The one or more sensors may be e.g. a temperature sensor, a flow sensor or a pressure sensor. Furthermore, the controller may be connected to further sensors for sensing vehicle braking parameters, such as engagement of brakes, brake friction, over-heating of brakes and/or for sensing vehicle inclination and declines the vehicle encounters.

In one embodiment, a hydrodynamic transmission circuit and retarder system for a vehicle can have a fluid tank having a first volume of fluid; a transmission case housing transmission gears for interacting with a geared shaft passing through the transmission housing. The transmission case housing can be in fluid communication with the first volume of fluid. The system can also include a retarder having a fluid chamber for housing a second volume of fluid. The fluid chamber can have a chamber inlet in fluid communication with the first volume of fluid and a chamber outlet. The system can also include a reserve tank for housing a third volume of fluid and can have an inlet for receiving fluid flow from the retarder outlet and an open outlet at a predetermine height of the reserve tank to maintain fluid at the third volume by allowing fluid flowing into reserve tank to exit to the fluid tank. In one embodiment, the third volume can be at least equal to the second volume. The system can also include controllable passage valve for selective control of fluid flow from first position preventing fluid flow of the third volume of fluid from the reserve tank outlet to the fluid tank to a second position allowing fluid flow of the third volume of fluid from the reserve tank outlet to the fluid tank. The system can also include a controllable retarder valve for selective control of fluid flow from an initial position allowing fluid flow from the fluid tank to the reserve tank bypassing the retarder or an active retarder position directing fluid flow from the fluid tank through the retarder and to the reserve tank and at least one pump in fluid communication with the first volume of fluid, the transmission case, the retarder and the reserve fluid tank. Wherein initial ignition of the vehicle activates the at least one pump to pump fluid from the first volume of fluid through the transmission case housing and back to the fluid tank, and to pump fluid from the first volume of fluid through the retarder valve in the initial position directing fluid flow to the reserve fluid tank, and wherein moving the retarder valve to an active retarder position directs fluid from the first volume of fluid to flow through the retarder chamber and to the reserve tank and moves passage valve to the second position direct fluid flow of the second volume in the reserve tank into the first volume of fluid.

BRIEF DESCRIPTION OF THE DRAWINGS

FIG. 5 is a schematic representation of a further embodiment of a hydrodynamic transmission and retarder system in a first operating condition; and FIG. 6 is a schematic representation of the embodiment of FIG. 5 in a second operating condition.

DETAILED DESCRIPTION

It is to be understood that the invention may assume various alternative components, orientations and configurations, except where expressly specified to the contrary. It is also understood that the specific devices and processes illustrated in the attached drawings, and described in the specification are simply exemplary embodiments of the inventive concepts disclosed and defined herein. Therefore, specific dimensions, directions or other physical characteristics relating to the various embodiments disclosed are not to be considered as limiting, unless expressly stated otherwise.

Figure 1:
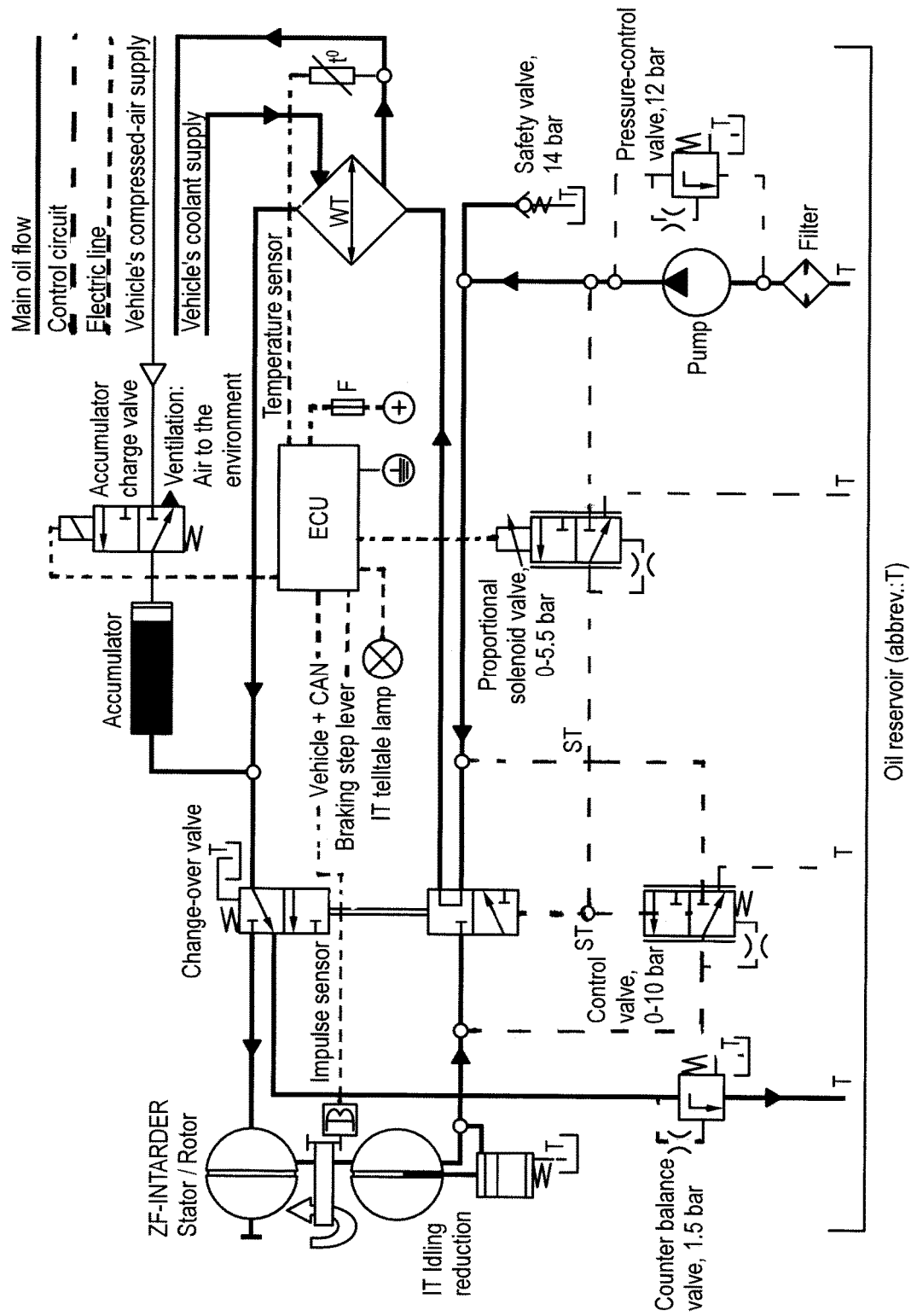
FIG. 1 is a schematic representation of a prior art retarder hydraulic fluid circuit.
Figure 2:
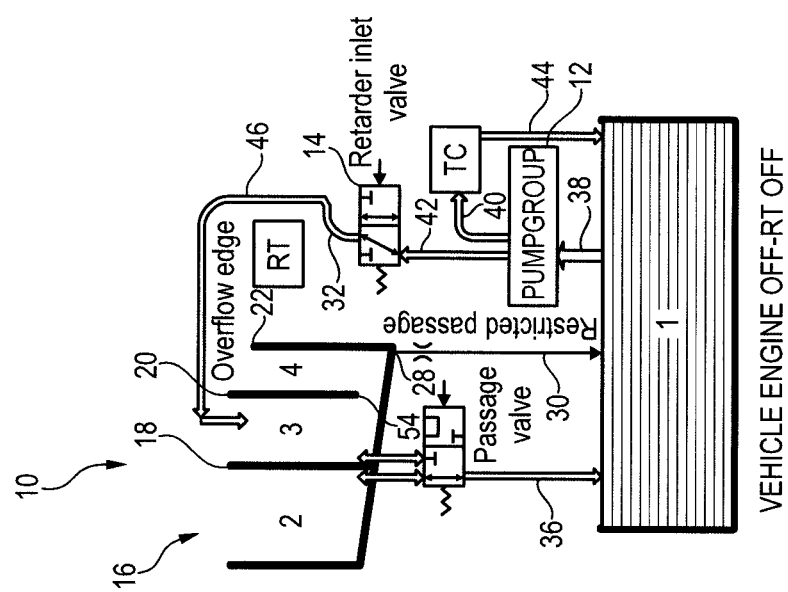
FIG. 2 is a schematic representation of one embodiment of transmission circuit and hydrodynamic retarder having sump level optimization according to the present disclosure in a first operating condition.
Figure 3:
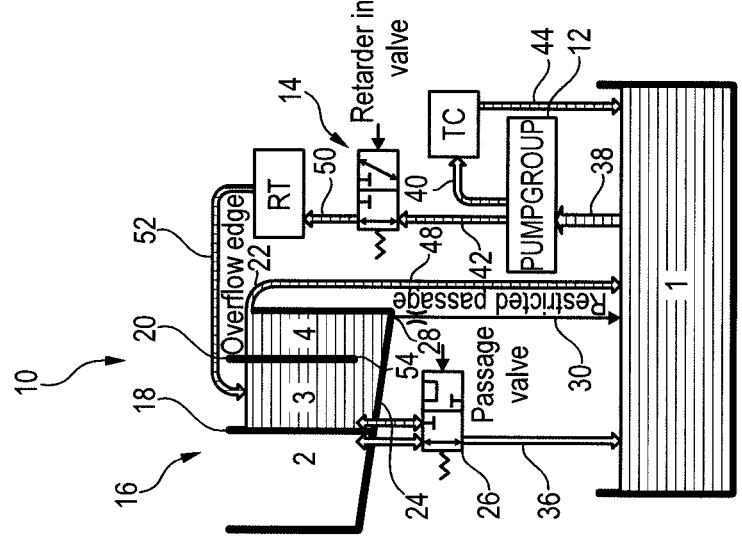
FIG. 3 is a schematic representation of the embodiment of FIG. 2 in a second operating condition.
Figure 4:
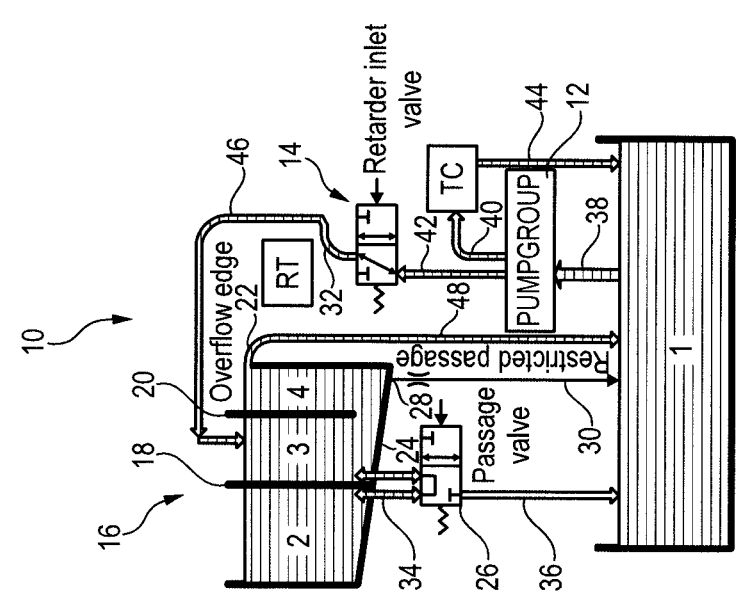
FIG. 4 is schematic representation of the embodiment of FIG. 3 in a third operating condition.

FIGS. 2-4 show schematic representations of one embodiment of a hydrodynamic transmission circuit (TC) and retarder (RT) system 10. In one embodiment of system 10, transmission circuit TC can include a manual, automated, or automatic transmission that typically has a transmission case or housing, a geared shaft, internal gears, and the internal fluid circuit. The TC can utilize hydraulic fluid such as transmission fluid, hydraulic oil or other similar oil or fluid.

The retarder (RT) can include any type of retarder that operates on fluid friction or viscous fluid drag to assist in slowing a vehicle. In one embodiment, RT can include a rotor or shaft passing through a sealed housing. The rotor can have fins or vanes and the interior of the sealed retarder housing can also include vanes, fins or ridges such as a stator. Filling of the retarder housing with fluid such as fluid from TC imparts friction or viscous drag against the fins of the rotor slowing its rotation. The rotor can be connected directly to the drive shaft of the transmission or can be integral with the transmission drive shaft. The rotor exiting the RT can be also be connected to the transmission drive shaft with additional gearing to further slow the rotation of the transmission drive shaft.

The churning, friction and viscous drag occurring in the RT can heat the fluid and introduce air into the fluid. In addition, the churning of the fluid in the TC and flow through the pump(s) and fluid path of the RT and TC can impart air into the fluid. Aerated fluid can have reduced performance characteristics and its function in the retarder and transmission can be impaired. High temperature fluid is also less viscous and less effective retardation and impaired functionally. To address over heating of the fluid some transmission and retarder systems can use the vehicle cooling system or even separate cooling systems to cool the fluid.

Addressing aeration of the fluid typically involved using more fluid than fluid circuits of the transmission and retarder system contain and storing the extra volume in an oil tank or sump to allow de-aeration to occur naturally through dissipation of air bubbles out of the fluid. This also has the additional benefit of reducing heating since there is a greater volume of fluid to heat and provides additional time for cooling of fluid remaining or stored in the sump as the first pumped volume circulates through the transmission circuit and retarder. Such solutions however are not well suited to mobile or vehicle applications as space constrains and weight limitations are also issues to be considered.

The TC and RT system 10 disclosed herein can use two or more fluid storage sumps shaped, configured and arranged to improve or optimize de-aeration and passive cooling of the transmission and retarder fluid. As shown in the embodiment of FIGS. 2-4, fluid sump 1 can be the main fluid sump. Sump 1 can be integral with the transmission or can be a separate fluid tank connected to the transmission case. In one embodiment, sump 1 can be positioned the lowest level of the fluid circuit of the TC and RT system 10 to utilize gravity to assist fluid to flow towards sump 1. In another embodiment, sump 1 is integral with TC and positioned at about the lowest level of the transmission case. Sump 1 can also be sized such that the height or level of the total volume of fluid in sump 1 is still below the gears of the transmission to avoid churning losses imparted to the fluid by mechanical action of the transmission gears while the fluid is present in sump 1.

TC and RT system 10 can have pump group 12 for pumping fluid through TC and RT system 10. Pump group 12 can be a single pump to deliver flow to TC and RC over all flow paths shown or multiple pumps for each of the flow paths shown. Pump group 12 can be a charge or gear pump, a variable displacement pump or other suitable pump. In one embodiment, pump group 12 is a single gear or charge pump gear pump with flow divider.

TC and RT system 10 can have retarder inlet valve 14. Retarder inlet valve 14 can be a switchable or actuatable valve in fluid communication with pump group 12. Retarder inlet valve 14 can direct fluid flow through either to RT when braking assistance or retarding assistance is desired or to bypass the RT for eventual return to main sump 1. Retarder inlet valve 14 can be switched on for sending fluid flow through the RT manually by the operator of the vehicle or can be automatic using automated systems such as one sensing vehicle braking parameters, such as engagement of brakes, brake friction, over-heating of brakes and/or one sensing vehicle inclination and declines the vehicle encounters. Retarder inlet valve 14 can be in a default off position such when the vehicle engine is off and on initial engine startup to direct fluid to bypass RT. Retarder inlet valve 14 receives fluid from pump group 12 and when switched on directs fluid flow through the RT. In one embodiment, fluid can enter an RT inlet and exit from a RT outlet to eventually discharge back to sump 1. When retarder inlet valve 14 is switched off whether by manual or automated system, fluid flow received from pump group 12 can be directed to bypass RT and eventually discharge back to sump 1.

In known retarder and transmission systems with shared fluid circuit, all the fluid necessary to fill the transmission and retarder including fluid flow lines is contained in a main or sole sump. In such systems, when the retarder is not needed, the retarder is typically bypassed and the main sump holds an additional volume of fluid that would be flowing through the RT when in use. This additional fluid raises the level of fluid in the main sump. Depending on the volume of the sump, this additional fluid being stored for retarder use may result in the fluid level reaching the transmission gears and cause undesired churning of the oil at least in systems where the main or only sump is integral with the transmission. When braking assistance is needed from the retarder, fluid flow is directed to fill the retarder which causes the fluid level in the main sump to decrease. This decreased level of fluid in the main sump may result in dead space in the main sump and the pump drawing air instead of fluid under certain vehicle orientations such as when positioned on a steep incline or decline. Maintaining a proper or optimal level of fluid in the main sump before filling of the retarder and after the retarder is filled must balance these competing issues among other issues such as de-aeration, fluid cooling and space constraints.

In one embodiment, TC and RT system 10 can ensure proper or optimum level of fluid in the main sump both before fluid is used in the RT and after filling the RT. Instead of enlarging the main or only sump and including an additional amount of fluid to ensure a proper or optimal level of fluid even after filling of the retarder, in one embodiment, TC and RT system 10 can include a second or auxiliary fluid sump 16. Auxiliary sump 16 can contain or house a volume of fluid that is at least the amount of fluid for filling the RT. In another embodiment, auxiliary sump 16 can contain a volume of fluid that is at least the amount of fluid to fill the RT and the fluid lines filling and discharging RT. In another embodiment the total volume of auxiliary sump 16 can have a volume that is at least substantially similar to the volume of fluid necessary to fill the RT and associated fluid flow from sump 1 and back. In yet another, embodiment auxiliary sump 16 can have a total volume that is from at least substantially similar to the volume of fluid necessary to fill the RT and associated fluid flow from sump 1 and back to as much as a plurality of the volume of sump 1.

Transmissions and retarders can come in many different sizes depending on the application. The size of the sump volume will vary according to the size of the retarder and transmission used. In one embodiment, main sump 1 can hold a fluid volume of from about 5 liters to about 200 liters. The auxiliary sump 16 can also come in many sizes depending on the size of the retarder and the space constraints of the vehicle. In one embodiment, the auxiliary sump can hold a volume of fluid that is at least substantially the same volume of the retarder chamber volume which can come in a variety of sizes. In typical retarder systems the retarder chamber can hold from about 5 liters to about 150 liters.

In the embodiment shown in FIGS. 2-4, auxiliary sump 16 can have three compartments 2, 3, 4. Compartment 2 can be sealed off from compartments 3 and 4 by barrier wall 18 and can have a separate fluid volume from the fluid volume housed by compartments 3 and 4. Compartments 3 and 4 can have a shared volume in fluid communication. In one embodiment, a partial wall 20 can extend upwards to a level above an overflow wall 22 and extend downwards short of contact with a sloped base 24 to allow fluid flow and communication in compartments 3 and 4 near the sloped base 24. Drain opening 28 can be included at the lowest point of sloped base 24 to allow fluid in compartments 3 and 4 to drain or empty into sump 1 via a restricted flow passage 30. Flow rate can be relatively slow since draining of compartments typically occurs when the vehicle is turned off. In one embodiment, drain opening can be opened and closed via a drain valve (not shown).

In one embodiment, the fluid housed in compartment 2 can be fluidly connected to the shared fluid in compartments 3 and 4 via a passage fluidly connected by passage valve 26. Passage valve 26 can also direct flow from compartment 2 to sump 1. Passage valve 26 can be controlled and/or actuated manually by the operator of the vehicle or by automatic systems or both. In one embodiment, passage valve 26 can be controlled by the same manual or automated systems that control retarder inlet valve 14 described above.

In one embodiment, auxiliary sump 16 can be located anywhere adjacent or near the RT and the fluid there in distributed with a pump. In one embodiment, auxiliary sump 16 can be connected to a housing of RT. In the embodiment shown in FIGS. 2-4 sump 16 can be positioned at a height or level above sump 1 to allow gravity to assist in fluid flow towards sump 1 when pump group 12 is not operating. Additionally or alternatively, sump 16 may be positioned at a height or level above pump group 12.

As discussed above, auxiliary sump 16 can have a volume that is from about a volume that is substantially similar to the volume of fluid to fill the RT to a plurality of the volume of sump 1. In the embodiment shown, compartment 2 can house a volume of fluid that is at least the amount to fill the RT and can also include the volume of fluid to fill the flow lines delivering fluid to and away the RT. This volume of fluid in compartment 2 approximating the RT filling volume can be released into the main sump 1 when retardation is activated and retardation valve 14 directs flow to RT in order to maintain the volume of fluid in the main sump 1 at about the same volume and/or level as before the RT filling began. Since retarders can come in all sizes the volume of fluid housed can vary substantially.

Accordingly compartment 3 and 4 can also come in different sizes and house a broad range of fluid volume depending on the size of the transmission and retarder system compartments 3 and 4 are used on. In one embodiment, compartment 3 and 4 can have a total volume of fluid from about 5 to about 200 liters.

Sump 1 can have at least a first volume of fluid to fill compartments 3 and 4 up to overflow wall 22, RT and TC and all the fluid circuit associated in delivering fluid from and returning fluid back to sump 1. This first volume represents a predetermined optimum or proper level in sump 1 to limit or prevent dead air space which could be drawn up by pump group 12 under all or nearly all vehicle orientations and/or inclinations. This level of fluid also prevents or avoids churning of fluid in sump 1 by transmission gears operating above sump 1. By separately housing or storing a volume of fluid approximating or equaling the volume of fluid to fill RT in compartment 2 and returning that volume main sump 1 when RT is activated, the level of fluid in main sump 1 can be or maintained at a proper or optimal level to prevent dead air spaces in the main sump at most or all vehicle orientations that may be reasonably encountered without having to enlarge the main or only sump. This also avoids having an initial raised fluid level where it can be churned by the transmission gears because the main sump has to house the additional fluid to fill the RT.

Additionally, system 10 addresses aeration/de-aeration and overheating issues encountered in known systems as will explained or made apparent with the following description of the operation of TC and RT system 10 below.

Starting from a vehicle engine off operational state, the fluid in the RT and TC system 10 is mostly drained of fluid into main sump 1 as shown in FIG. 4. Retarder inlet valve 14 starts in an off position and defaults to an off position whenever the engine is turned off to direct fluid flow to bypass the RT via bypass fluid line or flow 32 to compartment 3. Passage valve 26 can also start or be in an off position and default to closed or off position whenever the vehicle engine is turned off to allow fluid flow from compartment 2 to sump 1 via fluid flow 36 and to prevent flow out from compartment 3 into compartment 2 via fluid flow 34.

On ignition of the vehicle engine and retarder RT not engaged, as shown in FIG. 2, pump group 12 begins pumping fluid from main sump 1 through fluid line 38 to TC via fluid line 40 and to retarder inlet valve 14 via fluid line 42. Fluid flows through TC and exits or discharges from TC outlet back into main sump 1 via fluid flow or line 44. With the retarder inlet valve 14 defaulted in the off position from the engine off, fluid flows to retarder inlet valve 14 and bypasses RT via fluid line 32 and can be discharged into auxiliary sump 16 via fluid line or flow 46 as shown in FIG. 2. In one embodiment, fluid line 46 can discharge into compartment 3. It is understood that fluid line 32 and 46 can combine at a joint or junction to provide a single or one flow line into compartment 3. In one embodiment, fluid flow line 46 or the single flow line can extend into the compartment 3 to prevent excessive splashing of fluid during discharge which could increase bubble or air formation. Alternatively, fluid flow line 46 can be in a raised position to avoid contact with fluid.

Fluid fills compartment 3 and 4 from the bottom and rises towards wall 18 until reaching passage valve 26. Passage valve 26 which can be in the default off or closed position when coming from vehicle engine off position shown in FIG. 4 can move to the on or open position on ignition of the vehicle engine to direct fluid to compartment 2 from compartment 3 and 4 as shown in FIG. 2. Under these conditions and retarder RT not yet activated to provide braking assistance, compartments 2, 3 and 4 can continue to fill with fluid to the overflow edge 22 as long as retarder inlet valve 14 directs flow thereto. Fluid level rises until reaching overflow wall or edge 22 and discharges in main sump 1. Overflow edge 22 can be set at level to maintain a volume of fluid in compartment 2 which is at least approximately equal to the volume needed to fill the RT. Fluid flow from the overflow edge returns to main sump 1 via flow 48. In one embodiment dedicated fluid line 48 carries fluid from overflow edge 22 to main sump 1 to avoid splashing and aeration of the fluid.

The fluid flow from sump 1 to auxiliary sump 16 continues until the vehicle engine is turned off as shown when moving from operational state shown in FIG. 2 to FIG. 4. Turning off the vehicle engine, stops pump group 12 allowing oil to drain from TC and fluid lines 32, 38, 40, 42, and 44 back to main sump 1. Passage valve 26 moves back to the off or closed position to allow any fluid contained therein to flow to sump 1 via fluid flow or flow line 36. The fluid stored in compartments 3 and 4 can drain via gravity through restricted drain opening 28 and restricted passage 30 with or without the assistance of a pump (not shown). Restricted passage 30 can have a controllable valve (not shown) that remains open to fluid flow unless is energized to close by the vehicle engine running. In one embodiment, drain opening 28 is not closed by a valve and is always open to fluid flow but is restricted to a slow flow or trickle by the size or diameter of restricted passage 30. In one embodiment, the flow rate from restricted passage 30 can be sufficient to permit even large volume, and filled compartment 3 and 4 to empty in a few minutes and in particular from about 2 to about 5 minutes.

During vehicle operation, the operator of the vehicle can activate an RT switch (not shown) to engage the retardation system and provide braking assistance as shown by the change in operation state from FIG. 2 to FIG. 3. The switch can be manually activated by a hand switch or a switch on or near the brake pedal. In another embodiment, retardation system can be activated by automatic sensing of vehicle inclination state, vehicle descend speed or the braking system such as whether the vehicle is traveling forward down a downward slope and the brakes are engaged. The RT switch (not shown) moves retarder inlet valve 14 to an on or open position to direct fluid flow to the RT via fluid flow or line 50 as shown in FIG. 3, instead of closed or bypass flow 32 as shown in FIG. 2. Fluid flows through RT and fills the retarder fluid chamber to cause viscous drag on the rotor or drives shaft passing therethrough to slow the rotor and/or drive shaft. Fluid can exit RT through an RT outlet and flow to compartment 3 or 4 via fluid line 52. In the embodiment shown in FIG. 3 fluid line 52 discharges fluid into compartment 3 and can extend into compartment 3 which can prevent excessive dripping or splashing on the surface of the fluid which can create agitation and the formation of air bubbles. In one embodiment fluid flow lines 32, 46 and 52 can join into one line discharging into compartment 3.

In addition activation of the RT switch can also actuate passage valve 26 to move to off or closed position stopping fluid flow from compartments 3 and 4 to compartment 2, and directing fluid flow to drain fluid compartment 2 into main sump 1 through fluid line 36 via gravity as shown in FIG. 2. In another embodiment flow out of compartment 2 can be provided by a pump. In one embodiment the flow out of compartment 2 can occur concurrently and at nearly the same rate or at about the same rate with the filling rate RT. In another embodiment, the flow out of compartment 2 can occur after a predetermined time and slightly slower that the filling rate of RT.

The volume of fluid that was contained in compartment 2 which can be about the same volume of fluid needed to fill RT flows to sump 1 and returns the level of fluid in sump 1 at an optimum or proper fluid level or volume or substantially similar fluid volume or level as it was prior to activation of the RT and compartments 3 and 4 filled. In order to reduce or minimize deviation of fluid level in main sump 1 while RT is filling, passage valve 26 and fluid line 36 can be configured to allow gravitationally assisted flow at rate that approximately matches the flow delivered by pump group 12 to RT. In another embodiment, TC and RT system can be sealed fluid circuit such that pump group provides same flow rate through at least the RT, sump 1 and sump 16. In another embodiment a separate pump can connect compartment 2 to sump 1 that matches or substantially matches the flow rate of pump group 12 to RT.

In one embodiment, the retarder inlet valve 14 and passage valve 26 can be operated electrically, electrohydraulic, pneumatic, electro mechanic, mechanic or manual actuation. In one embodiment valves 14 and 26 can both be operated with pilot supply or hydraulically operated. In embodiments described above, retarder inlet valve 14 and passage valve 26 are described as three way valves with two positions. Other flow distribution devices or combination of devices having similar two flow positions can be used.

As described above during operation of the RT, fluid is pumped to RT and exits from RT to compartment 3 through flow line 52. The spinning and churning of fluid occurring in RT can introduce air into the fluid and can heat the fluid. Flow through TC can also heat and introduce air in the fluid. In RT systems have only a single sump must rely on the large volume of fluid in the single sump to provide dissipation and dilution of both heat and de-aeration to occur. The more time the heated and aerated fluid sits in the sump before entering the RT the more cooling and de-aeration can occur through dilution storage time in the single sump.

In TC and RT system 10, the hotter and more aerated fluid exiting RT flows to compartment 3. Partial wall 20, can prevent the fluid from directly flowing through the overflow edge 22 to sump 1 and instead can force the fluid to flow towards the bottom of compartment 3 and 4. This allows the heated and aerated fluid more time to cool and de-aerate. After passing beyond the bottom edge 54 can fluid mix more thoroughly with the fluid present in compartment 4. This point the fluid can proceed to the overflow edge 22 through flow line 48 to sump 1. Partial wall 20 can also prevent or block foam that may form on the surface of compartment 3 as fluid flows into compartment 3 from RT from flowing out the overflow edge and to sump 1. This flow from sump 1, through RT, to compartment 3, compartment 4 and back to sump 1 continues until the RT is switched off or deactivated. It is also understood that additional time fluid takes to flow through compartment 3 and 4 allows more heat to dissipate. The additional surface area provided by walls of sump 16 walls also increase heat dissipation. The initial or first filling of compartment 2 provides additional un-aerated or de-aerated fluid that has not yet been subjected to churning by the transmission which can introduce air into the oil. In another embodiment, compartment 3 and 4 is a single compartment lacking partial wall 20.

Manually turning off or automatic deactivation of RT when RT was active as shown by the change in operational state shown in FIG. 3 to the operational state shown in FIG. 2, retarder inlet valve 14 can move to the closed or off position to direct flow to bypass RT and to flow through flow line 32, 46 to compartment 3 and 4, and can switch passage valve 26 to the off position closing flow out of compartment 2 to sump 1 and allowing or opening fluid to flow from compartment 3 and 4 to compartment 2. Typically, fluid in RT can be expelled by the centrifugal force generated by the rotor through line 52 (and 46) to flow to compartment 3. RT can pull air through a check valve (not shown) to allow the RT to expel the oil and replace it by air. RT can be reactivated at any time while the vehicle engine is running to return the flow shown in FIG. 3. Turning off the engine can occur whether or not the RT is active or running.

Turning the engine off when the RT is not activated which is shown as a change in operational stage from FIG. 2 to FIG. 4. Passage valve 26 in an alternate embodiment can block fluid flow from compartment 2 to sump 1 and block flow between compartment 2 and compartment 3 and 4. In this embodiment, passage valve 26 can be a three-way/three-position valve. In order to drain fluid from compartment 2, compartment 2 can have a restricted passage (not shown) to permit trickle or slow flow to sump 1. In one embodiment, the flow rate from restricted passage for compartment 2 can be sufficient to permit even large volume, and filled compartment 2 to empty in a few minutes and in particular from about 2 to about 5 minutes. In this embodiment, the flow out of the restriction passage should not exceed and preferably should be significantly slower than the fluid supplied to compartment 2 so level or volume control of compartment 2 is not significantly affected. Compartment 2 can then slowly empty to sump 1 when the vehicle engine is shut off via the restricted passage. Fluid can be collected in sump 1 to allow fluid replacement or other maintenance purpose.

Sump 1 can have a sloped floor (not shown) and one way drain plug (not shown) located at the lowest point of sump 1 to remove all fluid from the TC and RT system 10 such as for maintenance purposes. In another embodiment sumps 1 and 16 can include their own dedicated drain plug at their lowest point to remove fluid therefrom. In yet another embodiment sump 16 can have a dedicated drain plug instead of drain opening 28 and restricted passage 30.

In another embodiment, with vehicle engine turned off passage valve 26 connects compartment 2 to compartments 3 and 4. Then compartment 2 runs empty via drain opening 28 and restricted passage 30, and all fluid gets collected in sump 1 which then can be emptied with a drain plug in case maintenance requires to do this.

In another embodiment, pump group 12 can be replaced by two pumps, a RT pump to supply fluid to auxiliary sump 16 and RT, and a second TC pump to supply fluid to TC. In such an embodiment the TC pump can remain on while the RT pump can be turned off once compartment 2 has filled through use of a float or other volume sensing device or flow rate sensing device.

While FIGS. 2-4 show auxiliary sump 16 having multiple compartments and/or separation walls, in another embodiment, auxiliary sump 16 can have a single compartment for storing at least a volume of fluid about equal to the volume to fill the RT and associated flow lines or paths which can reintroduced into sump 1 to maintain an optimum or proper level of fluid in sump 1. Accordingly, passage valve 26 may be not necessary. In another embodiment, to compensate lowered level in the main sump 1 when the RT is activated, the height of the overflow edge of single compartment sump 2 could be lowered to a predetermined level that releases an equal amount of fluid to sump 1 as what was needed to fill the RT.

FIG. 5 and FIG. 6 shows another system 10 that solely deviates from the system 10 depicted in FIGS. 2-4 in that a passage valve 260 is used instead of passage valve 26. Compared to passage valve 26, passage valve 260 allows a restricted fluid flow from compartments 2, 3 and 4 to the fluid line 36 and to the sump 1 in the first operating condition according to the configuration shown in FIG. 5. The restricted passage provide by passage valve 260 is small enough to allow compartments 2, 3 and 4 of sump 16 to get entirely filled in the first operation condition. Thus, the fluid connection provided by the passage valve 260 between the compartment 2 and compartments 3 and 4 has a larger flow rate than the restricted passage provided by the passage valve 260 from the compartments 2, 3 and 4 to the sump 1.

In FIG. 6, the system 10 having the passage valve 260 is shown in the second operating condition. In this operating condition, the passage valve 260 allows a fluid flow from compartment 2 to the sump 1. Further, the passage valve 260 allows a restricted fluid flow from compartments 3 and 4 to fluid line 36. Fluid line 36 is sized such that fluid flow from compartments 3 and 4 is directed to sump 1 and not to compartment 2. In other words, compartment 2 will not be filled in the second operating condition of system 10. Thus, passage valve 260 allows a restricted fluid flow from compartments 3 and 4 to sump 1 in the first operating condition and the second operating condition of the system 10. In the embodiments shown in FIGS. 5 and 6, fluid flow from the second sump 16 to sump 1 is facilitated via fluid lines 36, 30 and 48 in both the first operating condition and the second operating condition.

Instead of the transmission TC or in addition to the TC the system 10 can comprise a device that is in fluid communication with the sump 1. The device can be any device that may occasionally, periodically or permanently require fluid from the sump 1. The pump group 12 may be additionally configured to pump fluid from the fluid sump 1 through the device and back to the fluid sump 1.

While this invention has been described with reference to illustrative embodiments, it will be understood that this description shall not be construed in a limiting sense. Rather, various changes and modifications can be made to the illustrative embodiments without departing from the scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

The invention is also related, inter alia, to the following aspects.

1. A hydrodynamic transmission and retarder system for a vehicle comprising:
    a. a fluid tank having a first volume of fluid;
    b. a transmission case housing transmission gears for interacting with a geared shaft passing through the transmission housing and in fluid communication with the first volume of fluid;
    c. a retarder having a fluid chamber housing a second volume of fluid, the fluid chamber having a chamber inlet in fluid communication with the first volume of fluid and a chamber outlet;
    d. a reserve tank for housing a third volume of fluid and having an inlet for receiving fluid flow from the retarder outlet and an open outlet at a predetermine height of the reserve tank to maintain fluid at the third volume by allowing fluid flowing into reserve tank to exit to the fluid tank; the third volume being at least equal to the second volume;
    e. a controllable passage valve for selective control of fluid flow from first position preventing fluid flow of the third volume of fluid from the reserve tank outlet to the fluid tank to a second position allowing fluid flow of the third volume of fluid from the reserve tank outlet to the fluid tank;
    f. a controllable retarder valve for selective control of fluid flow from an initial position allowing fluid flow from the fluid tank to the reserve tank bypassing the retarder or an active retarder position directing fluid flow from the fluid tank through the retarder and to the reserve tank;
    g. at least one pump in fluid communication with the first volume of fluid, the transmission case, the retarder and the reserve fluid tank;
    wherein initial ignition of the vehicle activates the at least one pump to pump fluid from the first volume of fluid through the transmission case housing and back to the fluid tank, and to pump fluid from the first volume of fluid through the retarder valve in the initial position directing fluid flow to the reserve fluid tank and wherein moving the retarder valve to an active retarder position directs fluid from the first volume of fluid to flow through the retarder chamber and to the reserve tank and moves passage valve to the second position direct fluid flow of the second volume in the reserve tank into the first volume of fluid.

2. A hydrodynamic transmission and retarder system for a vehicle comprising:
    a. a fluid sump for housing a fluid and having a first fluid volume;
    b. a pump for pumping a fluid from the fluid sump;
    c. a retarder having a fluid chamber for housing a second volume of the fluid;
    d. a second sump for housing at least a third volume of the fluid and fluidly connected to fluid sump at an overflow opening positioned to allow the second sump to contain up to a third volume of the fluid; the third volume being substantially the same volume as the second volume;
    e. a retarder inlet valve fluidly connected to sump via pump and movable between a closed position for directing fluid flow to the second sump and an open position for directing fluid flow to the retarder, the valve movable from the closed position to the open position when the retarder is activated; and
    f. passage valve actuatable between at least a first position allowing fluid flow from the second sump to the fluid sump and a second position preventing fluid flow from secondary sump to the fluid sump,
    wherein in a first operational state with the vehicle powered on and the retarder deactivated, the pump directs fluid flow from fluid sump to the retarder inlet valve is in the closed position and directing fluid flow to second sump, the passage valve is in the second position allowing the second sump to fill until fluid discharges from overflow opening, vehicle is powered off or retarder is activated; wherein in a second operational state with the vehicle on and retarder activated, retarder inlet valve moves to the open position directing fluid flow into the retarder chamber and flowing out of the retarder chamber after filling the second volume and discharging to secondary sump and passage valve moves to the first position to allow fluid flow from the second sump to the fluid sump.

3. A hydrodynamic transmission and retarder system of aspect 2 wherein the secondary sump includes a full partition wall separating the second sump into two fluid compartments, one of the two compartments having a volume about equal to the third volume, and wherein when the passage valve is in the first position passage valve allows fluid flow from one of the compartments having the third volume to the fluid sump and prevents fluid flow between the two compartments and when in the second position passage valve prevents fluid flow from secondary sump to the fluid sump and allows fluid flow between the two compartments.

4. A hydrodynamic transmission and retarder system of aspect 3 wherein the other one of the two compartments includes a partial wall for separating an upper portion of the fluid contained in a first partition space from a second partition space of the other one the compartments and allowing fluid communication at a lower portion of the fluid contained in the other one of the compartments and wherein fluid flow from the retarder inlet valve in the closed position or from retarder chamber flows to the first partition space and second partition includes the overflow opening.

5. A hydrodynamic transmission and retarder system of aspect 4 wherein the floor of the second sump is sloped downwards from the one of the compartments to the second partition space, and the first partition space positioned between the one of the compartments and the second partition.

The invention claimed is:

1. A hydrodynamic retarder system for a vehicle comprising:
   a. a fluid sump for housing a fluid and having a first volume of the fluid;
   b. a pump for pumping the fluid from the fluid sump;
   c. a retarder having a fluid chamber for housing a second volume of the fluid;
   d. a second sump for housing at least a third volume of the fluid and fluidly connected to the fluid sump; the third volume of the fluid being substantially a same volume as the second volume of the fluid;
   e. a retarder inlet valve fluidly connected to the fluid sump via the pump and movable between a closed position for directing fluid flow to the second sump and an open position for directing fluid flow to the retarder, the retarder inlet valve movable from the closed position to the open position when the retarder is activated; and
   f. a passage valve actuatable between at least a first position allowing fluid flow from the second sump to the fluid sump and a second position preventing or restricting fluid flow from the second sump to the fluid sump, wherein the restricted fluid flow from the second sump to the fluid sump in the second position of the passage valve is smaller than the fluid flow from the second sump to the fluid sump in the first position of the passage valve;
   wherein in a first operational state with the vehicle powered on and the retarder deactivated, the pump directs fluid flow from fluid sump to the retarder inlet valve being in the closed position and directing fluid flow to the second sump;
   wherein in a second operational state with the vehicle on and the retarder activated, the retarder inlet valve moves to the open position directing fluid flow into the retarder and flowing out of the retarder after filling the second volume of the fluid and discharging to the second sump.

2. The hydrodynamic retarder system of claim 1, wherein in the second operational state the passage valve is in the first position to allow fluid flow from the second sump to the fluid sump.

3. The hydrodynamic retarder system of claim 1, wherein the second sump is fluidly connected to the fluid sump at least at an overflow opening positioned to allow the second sump to contain up to the third volume of the fluid.

4. The hydrodynamic retarder system of claim 3, wherein in the first operational state the passage valve is in the second position allowing the second sump to fill until fluid discharges from the overflow opening, the vehicle is powered off or the retarder is activated.

5. The hydrodynamic retarder system of claim 1, wherein the hydrodynamic retarder system is a hydrodynamic transmission and retarder system, and further comprising a transmission in fluid communication with the fluid sump, wherein the pump is additionally configured to pump fluid from the fluid sump through the transmission and back to the fluid sump.

6. The hydrodynamic retarder system of claim 5, wherein the second sump includes a full partition wall separating the second sump into two fluid compartments, one of the two compartments having a volume about equal to the third volume of the fluid, and wherein when the passage valve is in the first position, the passage valve allows fluid flow from the one of the two compartments having the volume about equal to the third volume of the fluid to the fluid sump and prevents or restricts fluid flow between the two compartments and, when in the second position, the passage valve prevents or restricts fluid flow from the second sump to the fluid sump and allows fluid flow between the two compartments.

7. The hydrodynamic retarder system of claim 1, wherein a second sump floor is sloped downwards and/or wherein a fluid sump floor is sloped downwards.

8. The hydrodynamic retarder system of claim 7, further including a drain opening at a lowest point of the fluid sump floor and/or the second sump floor.

9. The hydrodynamic retarder system of claim 8, further including a drain valve for opening and closing the drain opening.

10. The hydrodynamic retarder system of claim 9, further including a restricted flow passage connecting the drain opening of the second sump with the fluid sump, the drain opening of the second sump allowing fluid in the second sump to drain or empty into the fluid sump via the restricted flow passage.

11. The hydrodynamic retarder system of claim 1, wherein in a third operational state with the vehicle powered off, all the fluid of the hydrodynamic retarder system resides in the fluid sump.

12. The hydrodynamic retarder system of claim 1, wherein the hydrodynamic retarder system is configured such that in the second operational state fluid flow from the second sump to the fluid sump has a flow rate that matches a flow rate of the fluid flow flowing into the retarder.

13. A hydrodynamic retarder system for a vehicle comprising:
   a. a fluid sump for housing a fluid and having a first volume of the fluid;
   b. a pump for pumping the fluid from the fluid sump;
   c. a retarder having a fluid chamber for housing a second volume of the fluid;
   d. a second sump for housing at least a third volume of the fluid and fluidly connected to the fluid sump; the third volume of the fluid being substantially a same volume as the second volume of the fluid; and
   e. a retarder inlet valve fluidly connected to the fluid sump via the pump and movable between a closed position for directing fluid flow to the second sump and an open position for directing fluid flow to the retarder, the retarder inlet valve movable from the closed position to the open position when the retarder is activated;
   wherein in a first operational state with the vehicle powered on and the retarder deactivated, the pump directs fluid flow from fluid sump to the retarder inlet valve being in the closed position and directing fluid flow to the second sump;
   wherein in a second operational state with the vehicle on and the retarder activated, the retarder inlet valve moves to the open position directing fluid flow into the retarder and flowing out of the retarder after filling the second volume of the fluid and discharging to the second sump, and
   wherein the second sump includes a partial wall for separating an upper portion of the fluid contained in a first partition space from a second partition space and allowing fluid communication at a lower portion of the fluid contained in the second sump and wherein fluid flow from the retarder inlet valve in the closed position or from the retarder flows to the first partition space and the second partition space includes a connection to the fluid sump.

14. The hydrodynamic retarder system of any of claim 13, wherein the hydrodynamic retarder system is a hydrodynamic transmission and retarder system, and further comprising a transmission in fluid communication with the fluid sump, wherein the pump is additionally configured to pump fluid from the fluid sump through the transmission and back to the fluid sump.

15. The hydrodynamic retarder system of claim 13, further including a drain opening at a lowest point of a fluid sump floor and/or a second sump floor.

16. A hydrodynamic retarder system for a vehicle comprising:
   a. a fluid sump for housing a fluid and having a first volume of the fluid;
   b. a pump for pumping the fluid from the fluid sump;
   c. a retarder having a fluid chamber for housing a second volume of the fluid;
   d. a second sump for housing at least a third volume of the fluid and fluidly connected to the fluid sump; the third volume of the fluid being substantially a same volume as the second volume of the fluid; and
   e. a retarder inlet valve fluidly connected to the fluid sump via the pump and movable between a closed position for directing fluid flow to the second sump and an open position for directing fluid flow to the retarder, the retarder inlet valve movable from the closed position to the open position when the retarder is activated;

wherein in a first operational state with the vehicle powered on and the retarder deactivated, the pump directs fluid flow from fluid sump to the retarder inlet valve being in the closed position and directing fluid flow to the second sump;
   wherein in a second operational state with the vehicle on and the retarder activated, the retarder inlet valve moves to the open position directing fluid flow into the retarder and flowing out of the retarder after filling the second volume of the fluid and discharging to the second sump, and
   wherein the second sump is positioned at a height or a level above the fluid sump and/or the pump.

17. The hydrodynamic retarder system of claim 16, wherein in the second operational state a passage valve is in an open position to allow fluid flow from the second sump to the fluid sump.

18. The hydrodynamic retarder system of claim 16, further including a drain opening at a lowest point of a fluid sump floor and/or a second sump floor.

19. The hydrodynamic retarder system of claim 16, further comprising a passage valve actuatable between at least a first position allowing fluid flow from the second sump to the fluid sump and a second position preventing or restricting fluid flow from the second sump to the fluid sump, wherein the restricted fluid flow from the second sump to the fluid sump in the second position of the passage valve is smaller than the fluid flow from the second sump to the fluid sump in the first position of the passage valve.

* * * * *